United States Patent
Kern et al.

[11] Patent Number: 6,016,976
[45] Date of Patent: Jan. 25, 2000

[54] VENTING NOZZLE

[75] Inventors: Alfred Kern, Scheenberg; Wolfgang Knühl, Buchen, both of Germany

[73] Assignee: Aurora Konrad G. Schulz GmbH & Co., Germany

[21] Appl. No.: 08/870,553

[22] Filed: Jun. 6, 1997

[30] Foreign Application Priority Data

Jun. 6, 1996 [DE] Germany ............................ 196 22 908

[51] Int. Cl.[7] ...................................................... B05B 1/26
[52] U.S. Cl. ........................ 239/503; 239/461; 239/513; 454/290; 454/316; 454/326
[58] Field of Search .................... 239/461, 500, 239/502, 503, 518, 524, 505, 504, 513; 454/155, 289, 290, 299, 305, 309, 311–313, 325, 333, 316, 326, 336

[56] References Cited

U.S. PATENT DOCUMENTS

| | | | |
|---|---|---|---|
| 2,067,575 | 1/1937 | Meyerhoefer | 454/316 |
| 2,472,748 | 6/1949 | Labus | 454/316 |
| 2,936,693 | 5/1960 | Sweedyk | 454/316 |
| 2,996,972 | 8/1961 | Johansson | 454/316 |
| 3,030,872 | 4/1962 | Brugler | 454/316 |
| 3,045,580 | 7/1962 | Johnson et al. | 454/313 X |
| 3,391,629 | 7/1968 | Snell | 454/290 |
| 3,938,430 | 2/1976 | Koppang | 454/290 |
| 4,142,456 | 3/1979 | Locker | 239/502 |
| 4,248,140 | 2/1981 | Hendricks et al. | 454/336 |
| 4,417,687 | 11/1983 | Grant | 454/290 X |
| 4,699,322 | 10/1987 | Jobst . | |
| 5,232,403 | 8/1993 | Marotta . | |
| 5,312,298 | 5/1994 | Myers | 454/325 X |
| 5,569,077 | 10/1996 | Lam et al. | 454/289 X |

FOREIGN PATENT DOCUMENTS

| | | | |
|---|---|---|---|
| 685107 | 8/1961 | Canada | 454/313 |
| 2153743 | 5/1973 | Germany . | |

*Primary Examiner*—Andres Kashnikow
*Assistant Examiner*—Steven J. Ganey
*Attorney, Agent, or Firm*—Robert W. Becker & Associates

[57] ABSTRACT

A venting nozzle has a housing having an air inlet through which an air flow enters the housing. The housing has an outlet through which the air flow exits. The outlet has deflection elements for deflecting the air flow. Parallel flaps are pivotably connected in the housing for shutting off the air flow. Meshing gear segments are positioned in the housing and connect the flaps. The meshing gear segments are arranged outside the air flow. A rotary control is coordinated with one of the flaps for controlling positioning of the flaps.

10 Claims, 2 Drawing Sheets

VENTING NOZZLE

BACKGROUND OF THE INVENTION

The invention concerns a venting nozzle with deflection element for the airflow exiting the nozzle, comprising a housing with air inlet and flaps pivotable on parallel axes in the airflow.

Known venting nozzles with one or more deflection elements for the airflow exiting the nozzle are embodied with a shut-off device for the airflow that is provided upstream from the deflection element(s). This device generally comprises a single pivotable flap that is positioned in the center of the airflow, where it not only requires a considerable overall height, but also, in particular, in the core area of the flow, causes a considerable turbulence with adverse effects in the area of the deflection elements such that the uniform formation of a fan-shaped flow with long range coverage and uniform application of the airflow to the windshield that are made larger and larger, e.g., in busses, but also in machinery, e.g., tractors, building crane cabs, etc., is not ensured.

Furthermore, flaps pivotable on parallel axes in the airflow are known as a shut-off device, whereby, in the prior art, they are connected by straps and guides that also cause disturbing turbulence, in particular, in the core area of the flow. Additionally, the installation expenditures for embodiments of this kind are considerable, and higher flow velocities may result in vibrations and noise pollution.

Based on this, the object of the invention is to provide a venting nozzle with a shut-off device that ensures the arrangement and adjustability of the flaps within the housing without affecting, in particular, the core flow.

SUMMARY OF THE INVENTION

The object of the invention is inventively solved by connecting the flaps by meshing gear segments that are arranged outside the airflow and by having a rotary control to be correlated with one of the flaps.

Hereby, it is advantageous that no resistance, e.g., from a flap, a guide, straps, etc., is present, at least within the core flow, when the shut-off device is completely opened. However, it is still possible to close the shut-off device completely or select any intermediate position and ensure the laminar, turbulence-free core flow anytime. When the shut-off de vice is completely opened, three air flows with a largely constant velocity profile advantageously strike the deflection elements, so that an optimized effect of the deflection elements based on their embodiment is achieved, although they are connected to a shut-off device.

The shut-off device has a small overall height. Therefore, any pivoting capabilities of the deflection elements are not affected. The space requirement in the instrument panel is small, which is advantageously achieved by embodying the gear segments on actuators that are pivotably arranged in the bearing bushings for the flaps in the housing.

A turbulence in the area of the shut-off device, caused, for instance, by burbling, is reduced by embodying the shut-off flaps planar and by completely integrating their axes. The flaps comprise bearing plates that contact the end faces of the bearing bushings and guiding elements that engage the bearing bushings. In this manner, a sealing on the flap sides is achieved at the same time.

The rotary control for the adjustment of the flaps from the outside comprises a control member that is connected to one of the actuators. Advantageously, the control member is pivotably embodied on the housing and comprises a gear segment that meshes with another gear segment that is coaxially arranged to the gear on the actuator, to which the rotary control is correlated.

The air outlet side of the housing is expediently provided with a frame that may be embodied rectangularly and comprises fastening elements for the venting nozzle. Within the frame a bearing ring for pivotable air deflection flaps may be arranged.

BRIEF DESCRIPTION OF THE DRAWINGS

The drawing shows an embodiment of the invention which will be explained in the following description. It is shown in.

DESCRIPTION OF PREFERRED EMBODIMENTS

Figure 1:
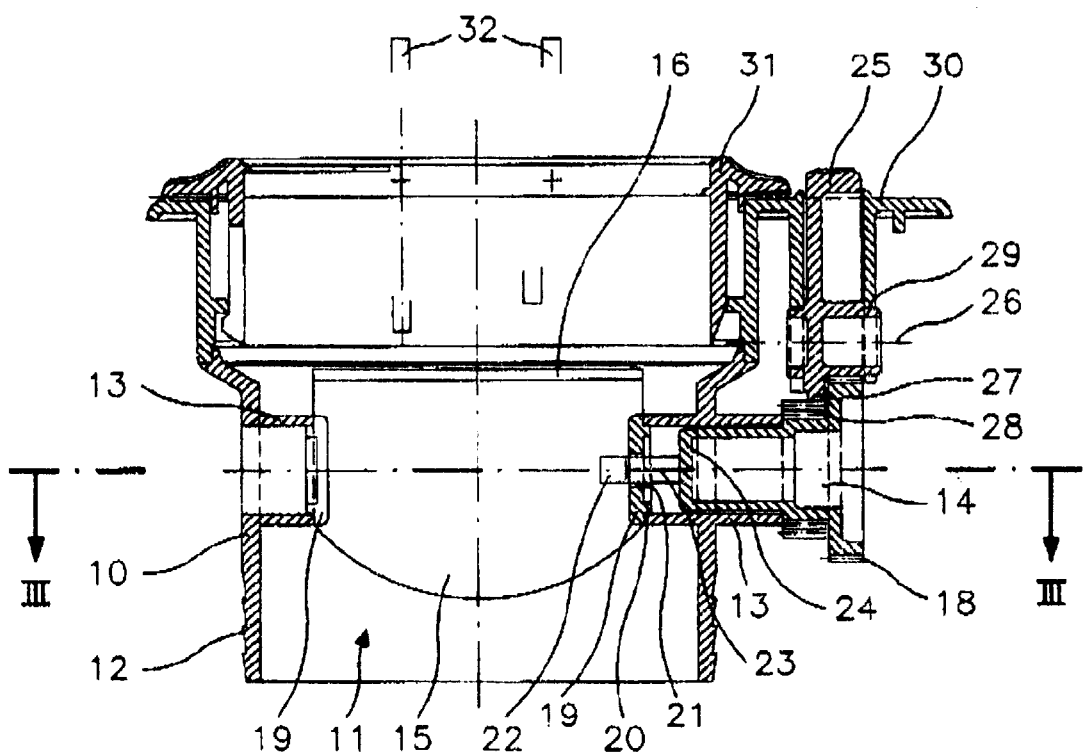
FIG. 1: A longitudinal cross-section of the venting nozzle with opened flaps.
Figure 2:
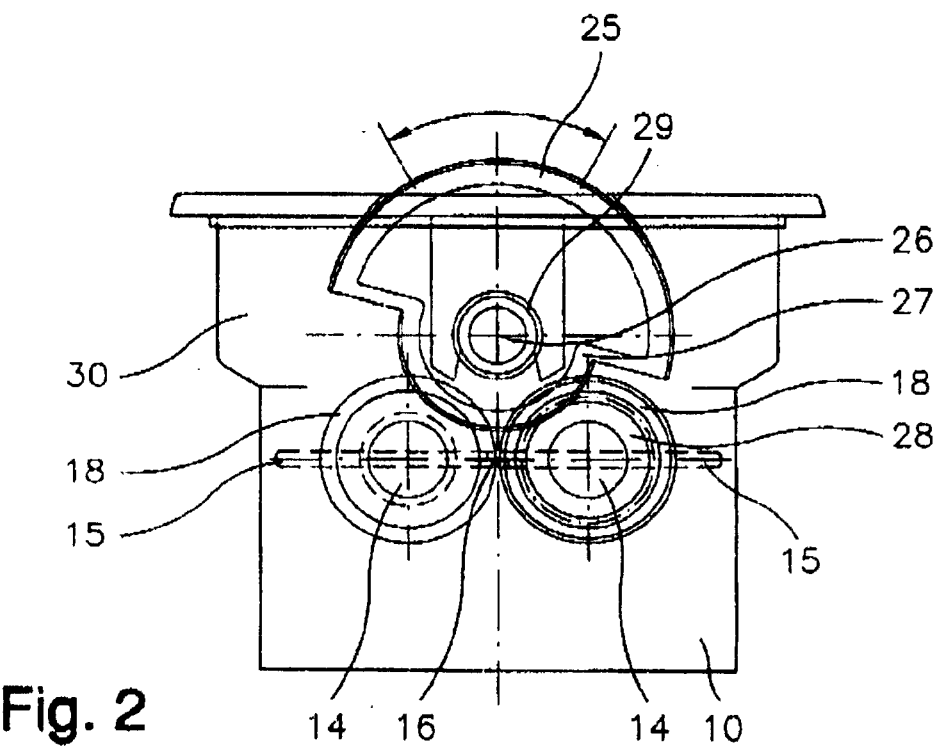
FIG. 2: A schematic side view of the venting nozzle with closed flaps.

According to FIG. 1, a housing 10 comprises an air inlet 11, whose outside surface is provided with connecting elements 12 for a hose, etc for the introduction of air, including heated, air-conditioned or cleaned air.

Figure 3:
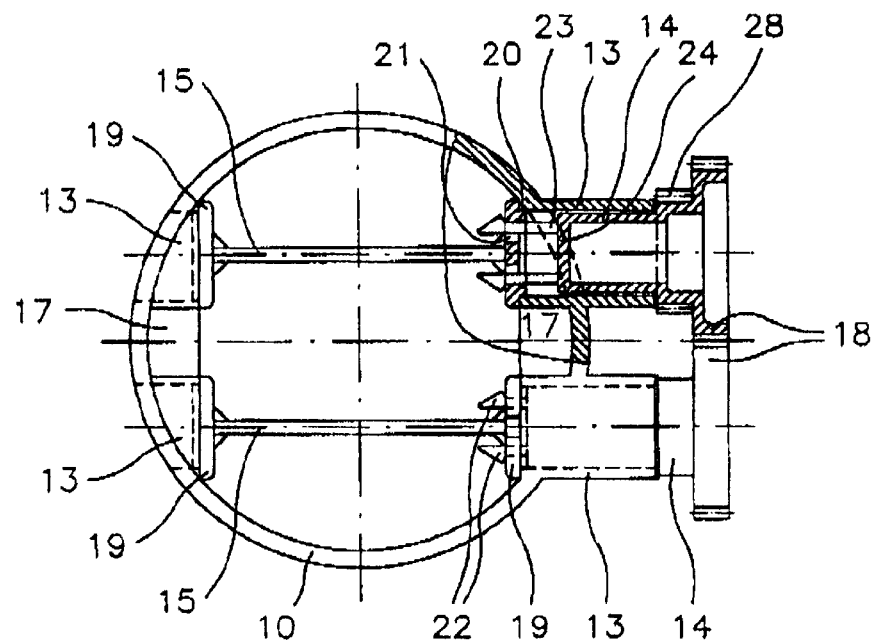
FIG. 3: A cross-section approximately along the section line III—III of FIG. 1, and FIG. 4: A top view of the venting nozzle.
Figure 4:
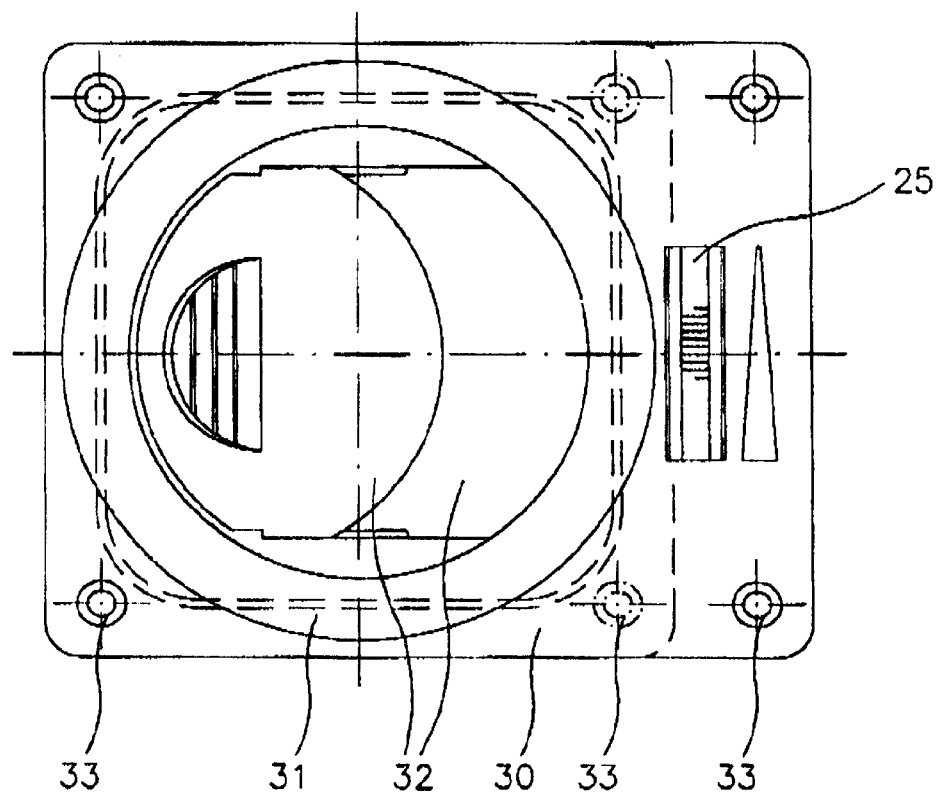

According to FIG. 3, the cylindrical housing 10 comprises a total of four bearing bushings 13, in which guide actuators 14 for the flaps 15 forming the shut-off device are guided. In their closed state, they shut off the entire cross section of the housing 11. The shut-off effect is improved by providing steps 16 on the free ends of the flaps 15 opposite from each other that engage each other in the closed state. Between two adjacent bearing bushings 13, ribs 17 may be embodied to prevent flow around the closed flaps 15.

Every actuator 14 is provided with a gear segment 18, wherein the two gear segments 18, that may be embodied as complete gear wheels, mesh with each other. The actuators 14 with the gear segments 18 are expediently manufactured as unitary plastic parts.

The flaps 15 have flat parallel surfaces and their axes are integrated into the surfaces without any projecting parts in the area of the axes. The flaps 15 are provided with coaxial bearing plates 19 on their end faces that contact the end faces of the bearing bushings 13 and engage with guiding elements 20 having a collar the bearing bushings 13, respectively.

The bearing plates 19 are provided with openings 21 through which the connecting elements 22 penetrate that are arranged on the free ends of arms 23. The arms 23 are non-rigidly spring mounted onto the cover 24 of each actuator 14 which cover 24 is facing the interior of the housing 10 and covers it in the area of the actuators.

The gear segments 18 are embodied as complete gear wheels that mesh outside the housing 10.

The rotary control comprises a manually actuated control member 25 that pivots about an axis 26. The control member 25 is embodied with a gear segment 27 that meshes with another gear segment 28 that is coaxially arranged to the gear wheel 18 on the actuator 14, to which the rotary control is assigned.

The air outlet side of the housing 10 is provided with a frame 30 in which, in the embodiment shown, a bearing ring 31 is rotatably supported. In a manner known per se, it comprises pivotable deflection flaps 32 that uniformly and in a fan-type way distribute the airflow exiting from the venting nozzle in a predetermined manner across the window area to be vented. On the frame 30, a bearing 29 is provided for the control member 25.

Expediently, the frame 30 may be embodied rectangularly in top view and may be provided with fastening elements on the corners, e.g., through bores 33, for mounting the venting nozzle to an instrument panel, etc.

The control member 25 for the adjustment of the flaps 15, arranged directly adjacent to the bearing ring 31, allows fine regulation of the air flow, wherein the adjustment of the flow direction is possible with the bearing ring 31 and the deflection flaps 32.

The present invention is, of course, in no way restricted to the specific disclosure of the specification and drawings, but also encompasses any modifications within the scope of the appended claims.

We claim:

1. A venting nozzle comprising:

a housing having an air inlet through which an air flow enters said housing;

said housing having an outlet through which the air flow exits;

said outlet having deflection elements for deflecting the air flow;

parallel flaps pivotably connected in said housing for shutting off the air flow;

meshing gear segments positioned in said housing and connecting said flaps;

said meshing gear segments arranged outside the air flow;

a rotary control coordinated with one of said flaps for controlling a position of said flaps; and actuators, wherein said housing comprises bearing bushings in which said flaps are supported, wherein said actuators are rotatably supported in said bearing bushings, and wherein said gear segments are unitary parts of said actuators.

2. A venting nozzle according to claim 1, wherein said flaps are planar and have a fully integrated axle, said flaps further comprising bearing plates having guiding elements, wherein said guiding elements engage said bearing bushings and said bearing plates rest on end faces of said bearing bushings.

3. A venting nozzle according to claim 2, wherein said guiding elements each have a collar engaging said bearing bushings.

4. A venting nozzle according to claim 1, wherein said actuators have an end facing the interior of said housing and wherein said ends have connecting elements connected to said bearing plates.

5. A venting nozzle according to claim 1, wherein said gear segments are gear wheels.

6. A venting nozzle according to claim 5, wherein said rotary control comprises a control member connected to one of said actuators.

7. A venting nozzle according to claim 6, wherein:

said control member is rotatably arranged at said housing and comprises a first gear segment and a second gear segment meshing with one another;

said second gear segment is positioned coaxially to one of said gear wheels of one of said actuators.

8. A venting nozzle according to claim 6, wherein said outlet comprises a frame having a bearing ring in which said deflection elements are supported.

9. A venting nozzle according to claim 8, wherein said frame includes a bearing for said control member.

10. A venting nozzle according to claim 8, wherein said frame is rectangular and has fastening elements for said venting nozzle.

* * * * *

UNITED STATES PATENT AND TRADEMARK OFFICE
CERTIFICATE OF CORRECTION

PATENT NO. : 6,016,976
DATED : 01/25/00
INVENTOR(S) : Alfred Kern and Wolfgang Knühl It is certified that error appears in the above-identified patent and that said Letters Patent is hereby corrected as shown below:

On title page, item [75] should read as follows:

[75] Inventors:

Alfred Kern, Schneeberg; Wolfgang Knühl, Buchen; both of Germany

Signed and Sealed this

Second Day of January, 2001

Attest:

Q. TODD DICKINSON

*Attesting Officer*  *Commissioner of Patents and Trademarks*